(12) United States Patent
Benecke

(10) Patent No.: US 6,662,409 B2
(45) Date of Patent: Dec. 16, 2003

(54) SHORTENING HOOK FOR STRANDS OF ROUND LINK CHAIN

(75) Inventor: Rainer Benecke, Herdecke (DE)

(73) Assignee: J.D. Theile GmbH & Co. KG, Schwerte (DE)

( * ) Notice: Subject to any disclaimer, the term of this patent is extended or adjusted under 35 U.S.C. 154(b) by 0 days.

(21) Appl. No.: 10/232,450

(22) Filed: Aug. 30, 2002

(65) Prior Publication Data

US 2003/0056340 A1 Mar. 27, 2003

(30) Foreign Application Priority Data

Sep. 1, 2001  (DE) .......................................... 201 14 484

(51) Int. Cl.⁷ .......................... F16B 45/04; F16G 17/00; B66C 1/36
(52) U.S. Cl. ....................... 24/369; 24/600.7; 24/600.8; 294/82.21
(58) Field of Search ............... 24/369, 601.6, 24/601.7, 600.7, 600.8, 600.9, 601.1, 598.7; 294/82.21

(56) References Cited

U.S. PATENT DOCUMENTS

| | | | | |
|---|---|---|---|---|
| ,276,965 A | * | 5/1883 | Gibbons | 24/600.7 |
| ,576,339 A | * | 2/1897 | Clayton | 24/600.7 |
| 1,667,957 A | * | 5/1928 | Stevenson | 294/82.21 |
| 2,419,947 A | * | 5/1947 | Foreman | 24/600.7 |
| 5,297,321 A | * | 3/1994 | Murai | 24/600.4 |
| 5,438,736 A | * | 8/1995 | Terada et al. | 24/599.8 |

FOREIGN PATENT DOCUMENTS

| | | | | |
|---|---|---|---|---|
| DE | 27 28 791 | * | 1/1979 | |
| DE | 2826966 | * | 10/1979 | F16G/17/00 |
| FR | 2229285 | * | 1/1975 | F16B/45/04 |
| GB | 2274978 | * | 8/1994 | A44B/15/00 |

OTHER PUBLICATIONS

Prospectus of German company Thiele, showing hook.*

* cited by examiner

Primary Examiner—Robert J. Sandy
(74) Attorney, Agent, or Firm—Collard & Roe, P.C.

(57) ABSTRACT

A shortening hook for strands of round link chain. A safety body is arranged in the mouth of the hook. The safety body is moveable by hand against the tension of a reset spring from the area of the mouth of the hook transversely to the trajectory motion of the hook. An operating link projects into the mouth of the hook and is arranged at the end section of the safety body. This operating link can be pressed back when the hook shaft takes hold so that the safety body frees up the mouth area.

5 Claims, 1 Drawing Sheet

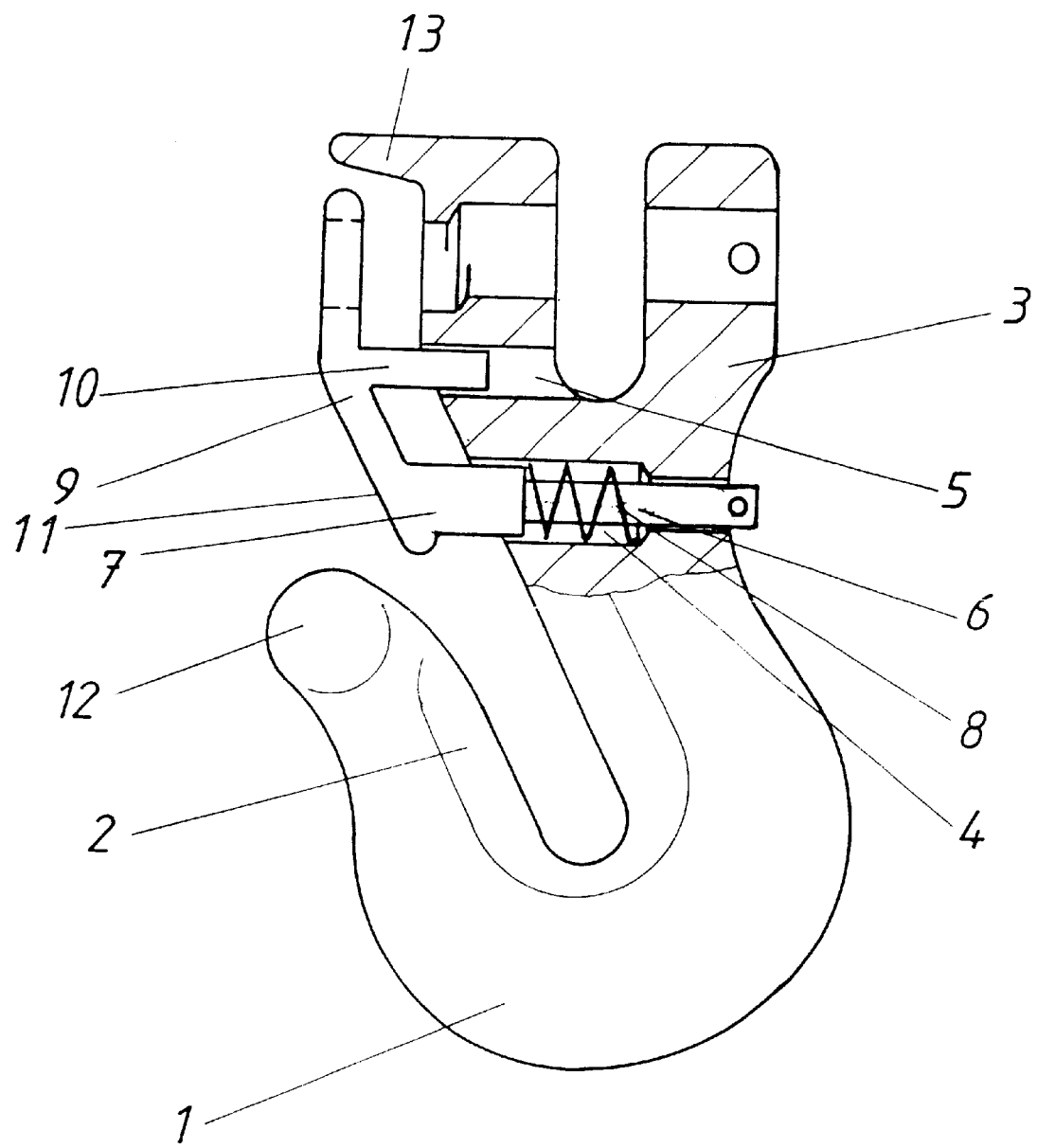

SHORTENING HOOK FOR STRANDS OF ROUND LINK CHAIN

BACKGROUND OF THE INVENTION

The invention refers to a shortening hook for strands of round link chain, having a safety body or catch arranged near the mouth of the hook. The safety body can be manually moved from a closed position in the area near the mouth of the hook to an open position. This movement is transverse to the trajectory motion of the hook and against the tension of a reset spring. The safety body prevents mounted chain links from coming off the hook.

A shortening hook is known that has a safety body that may be moved from the mouth or opening of the hook against the pressure of a reset spring, from the side of the hook shaft which faces away from the hook mouth. The chain link can be unhooked once the hook mouth is open after the safety body is moved. In practice, it is very difficult to separate the shortening hook from the round link chain, since the safety mechanism must be pulled out against the tension of the reset spring, the chain must be simultaneously held and the chain unhooked. It is very difficult to simultaneously hold the hook and detach the safety mechanism with one hand, while the other hand unhooks the chain strand.

The task of the invention is to form a shortening hook with a safety mechanism that simplifies this disassembly.

SUMMARY OF THE INVENTION

The task of the invention is solved with a shortening hook with a safety body arranged in the mouth of the hook. The safety body is moveable by hand against the tension of a reset spring from a closed position in the area of the mouth of the hook to an open position. This movement is transverse to the trajectory motion of the hook. The safety body is operable by the push of a finger and operable from the mouth side of the hook. An operating link projects into the mouth of the hook and is arranged at the end section of the safety body. This operating link can be pressed back when the hook shaft takes hold so that the safety body frees up the mouth area.

The connection area of the fishplate-like operating link to the safety body is formed so that, when inserting the chain link, the chain link pushes the safety body back against the tension of the reset spring, so that the chain link slips into the mouth of the hook. The safety body springs back again into the safety position once the link is in place on the hook.

When a person grasps the hook in the area of the hook shaft, the safety body can be pushed with a finger into its open position with the push of a finger, so that the hook mouth is open for removing a chain link with the other hand.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawing, wherein similar reference characters denote similar elements throughout the several views:

The FIGURE shows a cross section of the shortening hook.

DETAILED DESCRIPTION OF THE PREFERRED EMBODIMENT

A shortening hook 1 has a hook mouth 2. Hook mouth 2 is bordered outwardly by a prong end 12. A hook shaft 3 is above shortening hook 1.

At the far end of hook mouth 2, a section 7 of a safety body 6 protrudes into the insertion area for a chain link of a round liked chain, which is not shown. Safety body 6 is moveable from a closed position on the side of hook mouth 2 into a stepped hole 4 against the tension of a reset spring 8. In a resting or closed position, untouched by a hand, body section 7 essentially closes the insertion area of hook mouth 2.

An operating link 9 is arranged at section 7 of safety body 6, which protrudes into mouth area 2. Operating link 9 is offset into the connection area with an insertion section 11. Insertion section 11 and prong end 12 form an insertion gap for the chain link to be hooked. The chain link presses safety body 6 through insertion section 11 approximately transversely to the trajectory motion of the hook in a hole 5 against the pressure of spring 8. The chain link to be hooked glides into hook mouth 2. After that, safety body 6 is again pushed into the closed position by means of spring 8.

Operating link 9 is guided into hole 5 in hook shaft 3 and secured against twisting with bolt 10. Above operating link 9 on hook shaft 3, a projection 13 is provided for that covers operating link 9. Thus operating link 9 is secured against unintended operation.

Operating link 9 can be acted upon by the push of a finger on the side of hook shaft 3 opposite hook mouth 2. With a corresponding lever bar, safety body 7 can be pulled back from the mouth area by pressing the corresponding operating link 9 in the direction of hook shaft 3.

Accordingly, while only a few embodiments of the present invention have been shown and described, it is obvious that many changes and modifications may be made thereunto without departing from the spirit and scope of the invention.

What is claimed is:

1. A shortening hook for strands of round link chain comprising:
   a hook mouth where the link chain enters to engage the shortening hook;
   a hook shaft disposed at a top of the shortening hook above said book mouth;
   a safety body moveably disposed in said hook shaft with a section of said safety body protruding into said hook mouth;
   an operating link disposed at a section of said safety body that protrudes into said hook mouth; and
   a reset spring disposed within said hook shaft against an end of said safety body opposite said hook mouth;
   wherein said section of said safety body partially blocks said hook mouth preventing unwanted detachment of the link chain from the shortening hook; and
   wherein said safety body moves transversely to the trajectory motion of the shortening hook, when pushed against the tension of said reset spring for detachment of the link chain from the shortening hook.

2. The shortening hook according to claim 1, wherein said safety body is able to be pushed from a side of the shortening hook containing the hook mouth.

3. The shortening hook according to claim 2, further comprising a projection disposed above and covering said operating link on said hook shaft.

4. The shortening hook according to claim 1, wherein said operating link further comprises a bolt that secures said operating link against twisting and wherein said hook shaft has a hole in which said operating link is guided therein.

5. The shortening hook according to claim 4, wherein said operating link comprises an insertion section, which forms an insertion gap with a prong end off the shortening hook when said insertion section protrudes into said hook mouth, and wherein the chain link is hooked by pushing said safety body out of said hook mouth into an open position.

* * * * *